United States Patent
Citti et al.

(10) Patent No.: US 9,073,773 B2
(45) Date of Patent: *Jul. 7, 2015

(54) REFRACTORY OBJECT, GLASS OVERFLOW FORMING BLOCK, AND PROCESS FOR GLASS OBJECT MANUFACTURE

(75) Inventors: Olivier Citti, Wellesley, MA (US); Andrea Kazmierczak, Marlborough, MA (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 34 days.

This patent is subject to a terminal disclaimer.

(21) Appl. No.: 13/417,118

(22) Filed: Mar. 9, 2012

(65) Prior Publication Data

US 2012/0227445 A1 Sep. 13, 2012

Related U.S. Application Data

(60) Provisional application No. 61/451,748, filed on Mar. 11, 2011.

(51) Int. Cl.
*C04B 35/101* (2006.01)
*C03B 17/06* (2006.01)
*C04B 35/626* (2006.01)

(52) U.S. Cl.
CPC ........... *C03B 17/064* (2013.01); *C04B 35/1015* (2013.01); *C04B 35/62665* (2013.01);
(Continued)

(58) Field of Classification Search
CPC   C03B 17/064; C04B 35/101; C04B 35/1015; C04B 2235/783; C04B 2235/3217; C04B 2235/3232; C04B 2235/3251; C04B 2235/5472
USPC ................................ 501/127; 65/193, 374.13
See application file for complete search history.

(56) References Cited

U.S. PATENT DOCUMENTS 3,378,385 A   4/1968  McCreight et al.
3,519,448 A   7/1970  Alper et al.
(Continued)

FOREIGN PATENT DOCUMENTS

CN   1210838 A   3/1999
CN   1835897 A   9/2006
(Continued)

OTHER PUBLICATIONS

"Glass for ION-Exchange Strengthening", L.A. Trushkova, R.P. Kelina, and Yu. N. Viktorova, Plenum Publishing Company (1982), 1 pg., Translated from Steklo i Keramika, No. 2, p. 13, Feb. 1982, http://resources.metapress.com/pdf-preview.axd?code=w1142mnnt5u61410&size=largest.

(Continued)

*Primary Examiner* — Karl Group
(74) *Attorney, Agent, or Firm* — Able Law Group, LLP; Adam Keser

(57) ABSTRACT

A refractory object can include at least 10 wt % $Al_2O_3$. In an embodiment, the refractory object can further include a dopant including an oxide of a rare earth element, Ta, Nb, Hf, or any combination thereof. In another embodiment, the refractory object may have a property such that the averaged grain size does not increase more than 500% during sintering, an aspect ratio less than approximately 4.0, a creep rate less than approximately $1.0 \times 10^{-5}$ μm/(μm×hr), or any combination thereof. In a particular embodiment, the refractory object can be in the form of a refractory block or a glass overflow forming block. The glass overflow forming block can be useful in forming an Al—Si—Mg glass sheet. In a particular embodiment, a layer including Mg—Al oxide can initially form along exposed surfaces of the glass overflow forming block when forming the Al—Si—Mg glass sheet.

9 Claims, 5 Drawing Sheets

(52) U.S. Cl.
CPC . *C04B2235/3206* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3244* (2013.01); *C04B 2235/3251* (2013.01); *C04B 2235/3418* (2013.01); *C04B 2235/3463* (2013.01); *C04B 2235/5436* (2013.01); *C04B 2235/5445* (2013.01); *C04B 2235/6023* (2013.01); *C04B 2235/6027* (2013.01); *C04B 2235/72* (2013.01); *C04B 2235/77* (2013.01); *C04B 2235/782* (2013.01); *C04B 2235/783* (2013.01); *C04B 2235/786* (2013.01); *C04B 2235/788* (2013.01); *C04B 2235/95* (2013.01); *C04B 2235/3217* (2013.01)

(56) References Cited

U.S. PATENT DOCUMENTS

| | | |
|---|---|---|
| 3,652,307 A | 3/1972 | Bakker |
| 3,808,013 A | 4/1974 | Manigault |
| 3,844,803 A | 10/1974 | Blanke et al. |
| 3,879,210 A | 4/1975 | LaBar |
| 3,953,563 A | 4/1976 | Kihlstedt et al. |
| 4,018,965 A | 4/1977 | Kerko et al. |
| 4,093,470 A | 6/1978 | Cherry |
| 4,117,055 A | 9/1978 | Alexanderson |
| 4,595,665 A | 6/1986 | Takayama et al. |
| 4,735,926 A | 4/1988 | Ando et al. |
| 5,061,526 A | 10/1991 | Robyn et al. |
| 5,076,815 A | 12/1991 | Kunz et al. |
| 5,137,853 A * | 8/1992 | Ichikawa et al. ............ 501/127 |
| 5,322,826 A | 6/1994 | Becker et al. |
| 5,326,512 A | 7/1994 | Stillwagon et al. |
| 5,403,795 A | 4/1995 | Koyama et al. |
| 5,733,830 A | 3/1998 | Endo et al. |
| 5,795,363 A | 8/1998 | Pecoraro et al. |
| 5,830,819 A * | 11/1998 | Shikata et al. ............. 501/153 |
| 5,856,254 A | 1/1999 | Feige et al. |
| 6,054,186 A | 4/2000 | Bonsall, III |
| 6,077,801 A | 6/2000 | Zanoli et al. |
| 6,143,678 A | 11/2000 | Yamamoto et al. |
| 6,158,248 A | 12/2000 | Beppu |
| 6,159,885 A | 12/2000 | Mizuno et al. |
| 6,383,963 B1 * | 5/2002 | Yamamoto et al. ......... 501/127 |
| 6,812,177 B2 | 11/2004 | Ishino |
| 7,148,167 B2 | 12/2006 | Shikata et al. |
| 7,335,617 B2 | 2/2008 | Boussant-Roux et al. |
| 7,648,732 B2 | 1/2010 | Ott et al. |
| 7,767,292 B2 | 8/2010 | Djuricic et al. |
| 7,939,458 B2 | 5/2011 | Nakamura et al. |
| 8,092,928 B2 * | 1/2012 | Schofalvi et al. ........... 428/699 |
| 8,187,990 B2 * | 5/2012 | Avedikian et al. ........... 501/105 |
| 2001/0019992 A1 | 9/2001 | Gaubil et al. |
| 2002/0103070 A1 | 8/2002 | Toshihiro |
| 2003/0078156 A1 | 4/2003 | Lowden |
| 2003/0109372 A1 | 6/2003 | Hasegawa et al. |
| 2005/0186469 A1 | 8/2005 | De Jonghe et al. |
| 2006/0293162 A1 | 12/2006 | Ellison |
| 2007/0015655 A1 | 1/2007 | Avedikian et al. |
| 2007/0203013 A1 | 8/2007 | Harmuth |
| 2008/0047300 A1 | 2/2008 | Rhoads |
| 2008/0269042 A1 | 10/2008 | Carty |
| 2009/0062106 A1 * | 3/2009 | Avedikian et al. ........... 501/105 |
| 2009/0131241 A1 | 5/2009 | Godard et al. |
| 2009/0233784 A1 * | 9/2009 | Schofalvi et al. ........... 501/127 |
| 2010/0068492 A1 | 3/2010 | Boussant-Roux et al. |
| 2010/0084016 A1 | 4/2010 | Aitken et al. |
| 2010/0087307 A1 | 4/2010 | Murata et al. |
| 2010/0089098 A1 | 4/2010 | Citti et al. |
| 2010/0151232 A1 | 6/2010 | Cabodi et al. |
| 2010/0159226 A1 | 6/2010 | Suchanek et al. |
| 2010/0179051 A1 | 7/2010 | Citti et al. |
| 2010/0212359 A1 | 8/2010 | Godard et al. |
| 2010/0251774 A1 | 10/2010 | Peterson |
| 2010/0298109 A1 | 11/2010 | Takenami et al. |
| 2011/0021340 A1 * | 1/2011 | Schofalvi et al. ............ 501/127 |
| 2011/0236743 A1 | 9/2011 | Kumar et al. |
| 2011/0251042 A1 | 10/2011 | Araki et al. |
| 2012/0006059 A1 * | 1/2012 | Dejneka et al. ............. 65/29.16 |
| 2012/0006069 A1 | 1/2012 | Kim et al. |
| 2012/0096822 A1 | 4/2012 | Raffy |
| 2012/0164540 A1 | 6/2012 | Park et al. |
| 2012/0180528 A1 * | 7/2012 | Ketcham et al. .................. 65/53 |
| 2012/0227445 A1 | 9/2012 | Citti et al. |
| 2012/0260696 A1 * | 10/2012 | Citti et al. ........................ 65/53 |
| 2012/0263929 A1 * | 10/2012 | Citti ............................. 428/212 |
| 2013/0217563 A1 | 8/2013 | Citti et al. |

FOREIGN PATENT DOCUMENTS

| | | |
|---|---|---|
| CN | 101124173 A | 2/2008 |
| CN | 101367665 A | 2/2009 |
| CN | 101687711 A | 3/2010 |
| CN | 101774749 A | 7/2010 |
| DE | 3725170 * | 2/1989 |
| DE | 112006003321 A5 | 10/2008 |
| EP | 0010834 A1 | 5/1980 |
| EP | 0701979 A1 | 3/1996 |
| EP | 0818259 A1 | 1/1998 |
| EP | 0850897 A1 | 7/1998 |
| EP | 1288177 A1 | 3/2003 |
| EP | 2407441 A2 | 1/2012 |
| FR | 2392946 | 12/1978 |
| GB | 618248 A | 2/1949 |
| GB | 960384 A | 6/1964 |
| GB | 1072536 A | 6/1967 |
| GB | 1531167 A | 11/1978 |
| JP | 56-69270 A | 6/1981 |
| JP | 56-92177 A | 7/1981 |
| JP | 60055459 B2 | 12/1985 |
| JP | 2069363 A | 3/1990 |
| JP | 02-092871 A | 4/1990 |
| JP | 2225369 A | 9/1990 |
| JP | 03083849 * | 4/1991 |
| JP | H04-310570 A | 11/1992 |
| JP | 5301762 A | 11/1993 |
| JP | 06-144922 A | 5/1994 |
| JP | H08-048561 A | 2/1996 |
| JP | 08175878 | 7/1996 |
| JP | 9030859 A | 2/1997 |
| JP | 9328357 A | 12/1997 |
| JP | 10218676 | 8/1998 |
| JP | 10218676 A | 8/1998 |
| JP | 11171639 A | 6/1999 |
| JP | 2942061 B2 | 8/1999 |
| JP | 11-343174 A | 12/1999 |
| JP | 2000-111024 A | 4/2000 |
| JP | 2003-081653 A | 3/2003 |
| JP | 3489588 B2 | 1/2004 |
| JP | 2004026561 * | 1/2004 |
| JP | 2004-203691 A | 7/2004 |
| JP | 2007504088 A | 3/2007 |
| JP | 2007197303 A | 8/2007 |
| JP | 2008501609 A | 1/2008 |
| JP | 2009158576 A | 7/2009 |
| JP | 2011088759 A | 5/2011 |
| JP | 2012020925 * | 2/2012 |
| RU | 2039025 C1 | 7/1995 |
| RU | 2140964 C1 | 11/1999 |
| SU | 1470731 A1 | 4/1989 |
| SU | 1675279 A1 | 9/1991 |
| SU | 1796601 | 2/1993 |
| TW | 200946467 A | 11/2009 |
| TW | 1332487 B | 11/2010 |
| WO | 01-92183 A1 | 12/2001 |
| WO | 2005/023726 A1 | 3/2005 |
| WO | 2006057669 A2 | 6/2006 |
| WO | 2009007933 A1 | 1/2009 |
| WO | 2009/020011 A1 | 2/2009 |

(56) References Cited

FOREIGN PATENT DOCUMENTS

| WO | 2010071892 A2 | 6/2010 |
|---|---|---|
| WO | 2011022639 A2 | 2/2011 |

OTHER PUBLICATIONS

"Standard Test Methods for Apparent Porosity, Water Absorption, Apparent Specific Gravity, and Bulk Density of Burned Refractory Brick and Shapes by Boiling Water", ASTM International, Designation: C20-00 (2005) 3 pgs.

The International Search Report and the Written Opinion received from the International Searching Authority (ISA/KR) for International Application No. PCT/US2012/031689 dated Oct. 25, 2012, 14 pages.

The International Search Report and the Written Opinion received from the International Searching Authority (ISA/KR) for International Application No. PCT/US2012/028633, dated Oct. 18, 2012, 14 pages.

NIST Property Data Summaries, http://www.ceramics.nist.gov/srd/summary/ftgbetal.htm, 2 pages, Apr. 2011.

The International Search Report and the Written Opinion received from the International Searching Authority (ISA/KR) for International Application No. PCT/US2013/021086, dated Jun. 17, 2013, 15 pages.

Felsche, J. et al., "The alkali problem in the crystal structure of beta alumina," Zeitschrift fur Kristallagraphie, Bd. 127, pp. 94-100, Jan. 22, 1968.

International Search Report from PCT/US2012/033409 mailed Mar. 4, 2013, 1 page.

Yujuan, Zhang, "The Effects of Ta2O5 and MgO Additives on Microstructure and Mechanical Properties of Ultra-pure Alumina Ceramics," Journal of Wuhan Institute of Building Materials, Dec. 31, 1983, Issue 1, pp. 27-42.

Search Results, 7 pages.

"The Saint=Gobain SEFPRO Unshaped Product Range 1991-2009", Jan. 1, 2009, pp. 1-7, XP002731397 <www.sefpro.com/uploaded files/>.

Davis Jr., et al., "What You Should Know About Fusion-Cast Refractories", Glass Industry, Jan. 1, 1989, vol. 70, No. 9, pp. 14-16.

\* cited by examiner

US 9,073,773 B2

REFRACTORY OBJECT, GLASS OVERFLOW FORMING BLOCK, AND PROCESS FOR GLASS OBJECT MANUFACTURE

PRIORITY CLAIM AND CROSS-REFERENCE TO RELATED APPLICATION

This application claims priority to U.S. Provisional Patent Application No. 61/451,748 filed on Mar. 11, 2011, and entitled "Refractory Object, Glass Overflow Forming Block, and Process for Glass Object Manufacture," and naming Olivier Citti et al. as inventors, which is incorporated by reference herein in its entirety.

FIELD OF THE DISCLOSURE

This disclosure, in general, relates to a refractory object including a glass overflow trough and a glass overflow forming block.

BACKGROUND

Alkali alumino-silicate glasses that contain magnesium oxide are being used in applications where mechanical performance is more important. These glasses can be formed using a fusion draw process, where liquid glass flows over the lips of a glass overflow forming block made of zircon material and fuses at the bottom of the glass overflow forming block to form a sheet. Zircon ($ZrSiO_4$) dissociates into $ZrO_2$ and $SiO_2$. The higher $SiO_2$ content may lead to formation of gas bubbles as it dissolves into the glass. $ZrO_2$ can create $ZrO_2$ solid nodules at the interface that can then be released into the glass forming defects. Accordingly, the glass overflow forming block has a reduced lifetime as zircon material erodes from the body of the glass overflow forming block while the glass that is manufactured is contaminated with an undesired element that disadvantageously affects its properties.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
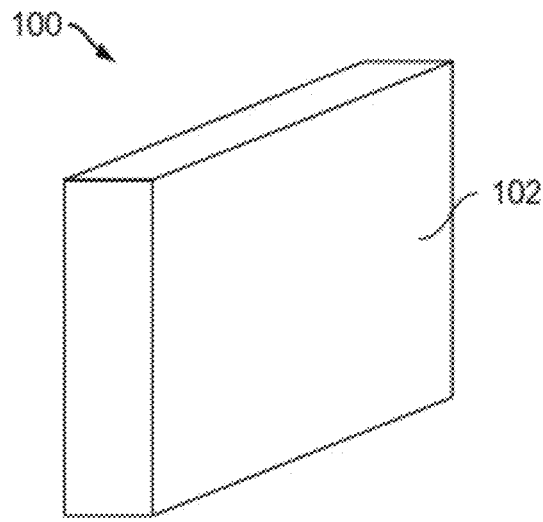
FIG. 1 is a diagram illustrating a particular embodiment of a refractory object.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

The term "aspect ratio," when referring to a grain, is intended to mean the longest dimension of the grain divided by diameter or other width of the grain.

The term "averaged," when referring to a value, is intended to mean an average, a geometric mean, or a median value.

Group numbers corresponding to columns within the Periodic Table of the elements use the "New Notation" convention as seen in the *CRC Handbook of Chemistry and Physics*, 81$^{st}$ Edition (2000-2001).

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the ceramic materials used as refractories.

In accordance with embodiments described herein, an alumina-based refractory object can be formed and have one or more properties that are better tailored to forming glass that includes aluminum, silicon, and magnesium ("Al—Si—Mg glass"). In particular, the alumina-based refractory objects described herein are more compatible with the alkali alumino-silicate glasses than the refractory objects formed from zircon described previously. Thus, many of the deficiencies involved with the use of zircon-based refractory objects to form alkali alumino-silicate glasses are overcome by the alumina-based refractory objects described herein.

In one set of embodiments, better control over the grain size can be achieved when the refractory object during heating, such as during sintering or when the refractory object is in use, such as when the refractory object includes a glass overflow forming block when forming glass sheets. For example, the aspect ratio may be relatively low, and in a particular embodiment, the grains may be substantially equi-axial. In another example, the increase in grain size during sintering may be kept relatively low. Controlling the grain size and achieving certain aspect ratios of grains within the refractory object can provide a more stable interface between the refractory object and the glass than refractory objects having larger grains, having more elongated grains, or both. Smaller grains in the refractory object and a more stable interface between the refractory object and the glass can contribute to a reduction in defects in the glass and an increase in the amount of time that the refractory object can be used. The refractory object may also have less creep rate, which may allow a refractory object, particularly a glass overflow forming block, to be used for a longer period of time before the refractory object would need to be replaced. After reading this specification, skilled artisans will appreciate that not all of the properties are required in all embodiments, and therefore, the description of properties is meant to illustrate, and not limit, concepts as described herein.

The refractory object can be a sintered ceramic material containing at least 10% by weight (hereinafter "wt %") of $Al_2O_3$. The sintered ceramic material can have at least approximately 50 wt %, approximately 60 wt %, approximately 70 wt %, approximately 80 wt %, approximately 85 wt %, approximately 90 wt %, approximately 93 wt %, approximately 95 wt %, approximately 97 wt %, approximately 98 wt %, approximately 99 wt %, or even approximately 99.5 wt % of $Al_2O_3$.

The refractory object can further include a particular dopant, wherein the dopant includes an oxide of a rare earth element, tantalum (Ta), niobium (Nb), magnesium (Mg), zirconium (Zr), hafnium (Hf), or any combination thereof. As used in this specification, the term "rare earth element" includes scandium (Sc), yttrium (Y), or any of the Lanthanides (lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu)). For example, the particular dopant can be $Ta_2O_5$, $Nb_2O_3$, $Nb_2O_5$, $ZrO_2$, $HfO_2$, $Y_2O_3$, $Sc_2O_3$, $Yb_2O_3$, $Pr_2O_3$, $Sm_2O_3$, $Gd_2O_3$, $La_2O_3$, $CeO_2$, $Dy_2O_3$, or any combination thereof. Alternatively, any of the foregoing elements may be added as a boride, carbide, halide, phosphate or the like, as opposed to a metal oxide.

The refractory object can include another dopant, such as a sintering agent. In a particular example, the sintering agent can help to reduce porosity. An exemplary sintering agent can include $Ta_2O_5$, $Nb_2O_3$, $Nb_2O_5$, $TiO_2$, $Fe_2O_3$, MnO, CuO, another suitable sintering agent, or any combination thereof. In a particular embodiment, a separate sintering agent is not used when the particular dopant as previously described can also act as a sintering agent, such as $Ta_2O_5$, $Nb_2O_3$, or $Nb_2O_5$.

In an embodiment, the refractory object may include substantially no or a very low content of Ti, Ca, Si, Fe, Na, or any combination thereof. Ti, Ca, Si, Fe, or Na may allow the grain size of the $Al_2O_3$ to become too large. When expressed as a wt % of $TiO_2$, CaO, $SiO_2$, $Fe_2O_3$, $Na_2O$, or any combination thereof, the content may be no greater than approximately 0.5 wt %. In another embodiment, the content may be no greater than approximately 0.09 wt %, no greater than approximately 0.05 wt %, or no greater than approximately 0.009 wt %. Calcium, silicon, or iron can be present as an undesired impurity in a starting material, such as $Al_2O_3$; however, $TiO_2$, CaO, $SiO_2$, $Fe_2O_3$ or $Na_2O$, may not be added as a separate component when combining powders before forming the corresponding green body for the refractory object. In another embodiment, Ti, Ca, Si, Fe, Na, or any combination thereof may be added and provide benefits, provided the desired grain size, shape, and aspect ratios can be achieved.

In an embodiment, the amount of any dopant, including the particular dopant, can be at least approximately 0.02 wt %, at least approximately 0.11 wt %, at least approximately 0.2 wt %, at least approximately 0.5 wt %, at least approximately 0.7, wt %, at least approximately 0.9 wt %, at least approximately 1.0 wt %, or at least approximately 1.1 wt %. In another embodiment, the amount may be no greater than approximately 5 wt %, no greater than approximately 4 wt %, no greater than approximately 3 wt %, no greater than approximately 2 wt %, or no greater than approximately 1.5 wt %.

In a further embodiment, with respect to a particular dopant including a rare earth element, tantalum (Ta), niobium (Nb), magnesium (Mg), zirconium (Zr), hafnium (Hf), or any combination thereof, the amount of such particular dopant can be selected to be sufficient to keep the averaged grain size of the $Al_2O_3$ from increasing more than a desired amount during sintering. In a particular embodiment, the amount of the particular dopant may be present at an amount so that the grain growth during sintering is no greater than approximately 500%, no greater than approximately 400%, no greater than approximately 300%, no greater than approximately 200%, or no greater than approximately 100%.

In the sintered ceramic material, the $Al_2O_3$ may be in the form of grains having an averaged grain size no greater than approximately 90 µm. The grain size is estimated from the observation of polished sections and the measurement of the length (maximum dimension) and width (minimum dimension) of a large number of single grains (at least 100 grains randomly chosen). The averaged grain size can be determined using the widths, lengths, or a combination thereof, for example an average of the average width and average length (i.e., (average width+average length)/2).

The same technique as described for obtaining size information for individual grains with respect to the average width or average length can be used to obtain information on median values for sizes of the grains. The median value for lengths of the grains may be no greater than approximately 60 µm, no greater than approximately 50 µm, no greater than approximately 40 µm, no greater than approximately 30 µm, or no greater than approximately 20 µm.

Thus, the averaged grain size can be based on an average width, an average length, a median value corresponding to the width or the length, or the like. Clearly, when comparing grain sizes, lengths of a sample are compared to the lengths of another sample or a prior art composition, widths of a sample are compared to the widths of another sample or a prior art composition, and a median value for grains of a sample are to be compared to the median values for grains of another sample or a prior art composition. In an embodiment, the averaged grain size is no greater than approximately in another embodiment, the averaged grain size is no greater than approximately and in a further embodiment, the averaged grain size is no greater than approximately 15 µm. In an embodiment, the averaged grain size is at least approximately 1 µm, in another embodiment, the averaged grain size is at least approximately 2 µm, and in a further embodiment, the averaged grain size is at least approximately 5 µm.

In another embodiment, size distributions can be determined from the data collected on the grains as previously described with respect to the average lengths and widths. As used herein, a D10 value represents the $10^{th}$ percentile, a D50 value represents the $50^{th}$ percentile, and a D90 value represents the $90^{th}$ percentile. Thus, D50 corresponds to the median value. In an embodiment where length is used as the basis of grain size, the D10 value for grain size for the grains is no greater than approximately 40 µm, no greater than approximately 30 µm, no greater than approximately 20 µm, no greater than approximately 15 µm, or no greater than approximately 11 µm. In another embodiment, the D50 value is no greater than approximately 60 µm, no greater than approximately 50 µm, no greater than approximately 40 µm, no greater than approximately 30 µm, or no greater than approximately 20 µm. In a further embodiment, the D90 value is no greater than approximately 90 µm, no greater than approximately 70 µm, no greater than approximately 50 µm, no greater than approximately 40 µm, or no greater than approximately 35 µm. The D10, D50, and D90 values are at least approximately 1 µm.

The distribution of grain sizes within the sintered ceramic material can have a single mode or multiple modes, such as two, three, four, etc. In an embodiment, the sintered ceramic material can have a bimodal distribution of averaged grain sizes. In a particular embodiment, one of the modes can have an averaged grain size that is less than approximately 50%, less than approximately 40%, or less than approximately 30% of the averaged grain size of the other mode.

In a further embodiment, aspect ratio can be determined from the data collected on the grains as previously described with respect to the average lengths and widths. The aspect ratio can be the average length divided by the average width. With respect to a median value for the aspect ratio, the median value is less than approximately 1.6, no greater than approximately 1.55, no greater than approximately 1.50, or no greater than approximately 1.45.

An averaged aspect ratio of the grains of the refractory object may not exceed approximately 4.0 within the sintered ceramic material. In another embodiment, the averaged aspect ratio is no greater than approximately 3.0, no greater than approximately 2.5, no greater than approximately 2.2, no greater than approximately 2.0, or no greater than approximately 1.5.

In an embodiment, distribution data can be used. The D10 value for the aspect ratio is less than 1.2, no greater than approximately 1.16, no greater than approximately 1.14, or no greater than approximately 1.12. In another embodiment, the D50 value for the aspect ratio is less than 1.6, no greater than approximately 1.55, no greater than approximately 1.50, or no greater than approximately 1.45. In a further embodiment, the D90 value for the aspect ratio is no greater than approximately 2.7, no greater than approximately 2.3, no greater than approximately 2.0, or no greater than approximately 1.8. The D10, D50, and D90 values are at least 1.0.

Another way to classify the grains with respect to the aspect ratio is to determine the percentage of grains having an aspect ratio of at least 2.0. In an embodiment, the percentage of grains having an aspect ratio of at least 2.0 is no greater than approximately 30%, no greater than approximately 20%, no greater than approximately 9%, or no greater than approximately 5%. Alternatively, the classification can be on the basis of the percentage area occupied by grains having an aspect ratio of at least 2.0. In an embodiment, the percentage of area occupied by grains having an aspect ratio of at least 2.0 is no greater than approximately 35%, no greater than approximately 25%, no greater than approximately 15%, or no greater than approximately 5%, or no greater than approximately 3%.

Based on the distribution data for grain size (e.g., lengths of the grains), aspect ratio, or both, refractory objects made in accordance with the concepts as described herein have a noticeably narrower distribution of grain size and aspect ratio.

In a particular embodiment, density and porosity of the refractory object can be determined using ASTM C20-00 Standard Test Method (reapproved 2005). In an embodiment, the density can be at least approximately 3.3 g/cc, at least approximately 3.5 g/cc, at least approximately 3.6 g/cc, or at least approximately 3.65 g/cc. In another embodiment, the density may be no greater than approximately 3.9 g/cc, no greater than approximately 3.8 g/cc, or no greater than approximately 3.7 g/cc. Porosity is expressed as a percentage. In one embodiment, the porosity of the refractory block is no greater than approximately 11%. In another embodiment, the porosity is no greater than approximately 9%, no greater than approximately 7%, no greater than approximately 5%. In another embodiment, the porosity is at least approximately 0.1%, at least approximately 0.3%, at least approximately 1.1%, at least approximately 2.0%, or at least approximately 3.0%.

The refractory object can be formed using metal oxides as previously described. In an embodiment, starting materials can include powders of the metal oxides. The $Al_2O_3$ powder can be in the form of particles having an averaged particle size no greater than approximately 100 µm. In an embodiment, the averaged particle size is no greater than approximately 30 µm, in another embodiment, the averaged particle size is no greater than approximately 20 µm, and in a further embodiment, the averaged particle size is no greater than approximately 15 µm. In an embodiment, the averaged particle size is at least approximately 0.5 µm, in another embodiment, the averaged particle size is at least approximately 1.0 µm, and in a further embodiment, the averaged particle size is at least approximately 5.0 µm.

In a particular embodiment, a combination of $Al_2O_3$ powders having different particle sizes can be used. The number of different particle sized $Al_2O_3$ powders can be two, three, four, or more. In a more particular embodiment, $Al_2O_3$ powders having two different particle sizes are used. In a particular embodiment, one of the $Al_2O_3$ powders can have an averaged particle size that is less than approximately 50%, less than approximately 40%, or less than approximately 30% of the averaged particle size of the other $Al_2O_3$ powder. For example, one of the $Al_2O_3$ powders can have a nominal particle size of 2 µm, and the other $Al_2O_3$ powder can have a nominal particle size of 10 µm. The $Al_2O_3$ powders of different particle sizes can be mixed in any ratio. For example, for $Al_2O_3$ powders having two different particle sizes can be mixed in a ratio of approximately 1:99, approximately 2:98, approximately 3:97, approximately 10:90, approximately 20:80, approximately 50:50, approximately 80:20, approximately 90:10, approximately 97:3, approximately 98:2, or approximately 99:1. Likewise, mixture of $Al_2O_3$ powders having three or more different sizes can be prepared in a ratio to meet the needs or desires for a particular application.

Another starting material can include a powder including an oxide of a rare earth element, tantalum (Ta), niobium (Nb), magnesium (Mg), zirconium (Zr), hafnium (Hf), or any combination thereof, as such oxides are described with respect to the refractory object. The dopant starting materials may have any oxidation state oxide, e.g., $M^{2+}$, $M^{3+}$, $M^{4+}$, $M^{5+}$, or any combination thereof, wherein M is a rare earth element, tantalum (Ta), niobium (Nb), magnesium (Mg), Zr, or Hf. The dopant can be added as an oxide, a boride, a carbide, a halide, a phosphate, or any combination thereof. In an embodiment, the powder can be in the form of particles having an averaged particle size no greater than approximately 30 µm, in another embodiment, the averaged particle size is no greater than approximately 20 µm, and in a further embodiment, the averaged particle size is no greater than approximately 15 µm. In an embodiment, the averaged particle size is at least approximately 0.1 µm, in another embodiment, the averaged particle size is at least approximately 0.5 µm, and in a further embodiment, the averaged particle size is at least approximately 1 µm.

Additional material that can be used can include a binder, a solvent, a dispersant, a thickener, a deflocculant, another suitable ingredient, or any combination thereof. In an embodiment, the additional material may include non-metallic compounds. In another embodiment, the additional material can include an organic compound, water, or the like.

The powders and additional material are combined and shaped to form a green body into a desired shape. Shaping can be performed using a technique, such as slip casting, uniaxial pressing, isostatic pressing, casting of a gel, vibro-casting, or any combination thereof. The shape can be rectilinear, cylindrical, spherical, ellipsoidal or nearly any other shape. In a particular, the body can be in the shape of a rectilinear block referred to as a blank that can subsequently be machined to form a glass overflow forming block. In another embodiment, the green body can be structured in such fashion to more closely match the final refractory object to reduce the extent of any further machine processing. For example, when the refractory object includes a glass overflow forming block, the shape of the green body may more closely resemble the glass overflow forming block to reduce the amount of subsequent machining and ceramic material that would discarded. More particularly, the green body may have a rectilinear portion adjacent to a tapered portion. The rectilinear portion and corresponding to a region where a glass overflow trough will be formed. In another embodiment, the green body may be shaped to have the glass overflow trough adjacent to the tapered portion After the green body is formed, the green body is heated in an oven, heater, furnace, or the like to form the refractory object that includes a sintered ceramic material. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 10 hours to approximately 200 hours. Following the initial heating, the sintering can be performed at a temperature in a range of approximately 1400° C. to 1700° C. for a time period in a range of approximately 10 hours to approximately 100 hours to form the refractory object.

The shape of the refractory object generally corresponds to the shape of the green body. Thus, the refractory object may have any of the shapes as previously described with respect to the green body. During sintering, some shrinkage may occur, and the refractory object may be smaller than the green body. In an embodiment as illustrated in FIG. 1, a refractory object 100 can be a refractory block 102 having a rectilinear shape having a length (l), width (w), and height (h). In an embodiment, any of the dimensions l, w, or h can be at least approximately 0.02 m, at least approximately 0.05 m, at least approximately 0.11 m, at least approximately 0.5 m, at least approximately 1.1 m, at least approximately 2.0 m, at least approximately 4.0 m, or more. In the embodiment as illustrated in FIG. 1, the refractory block 102 can be a blank from which a glass overflow forming block can be formed.

Figure 2:
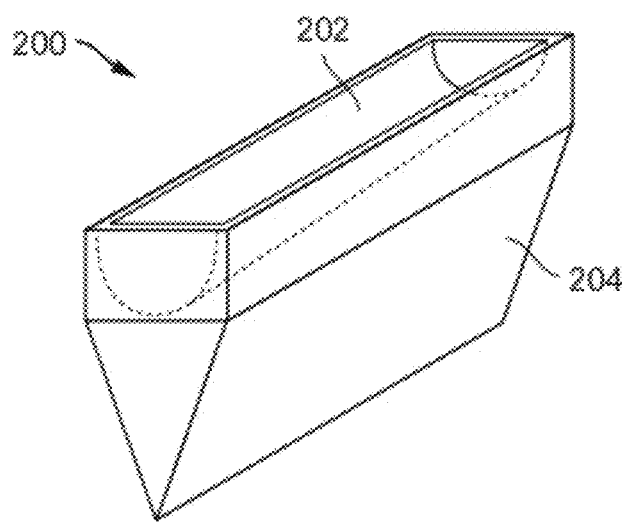
FIG. 2 is a diagram illustrating a particular embodiment of a glass overflow trough.
Figure 3:
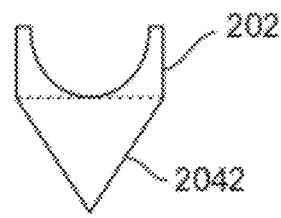
FIG. 3 is a diagram illustrating a particular set of various cross-sectional perspectives of glass overflow troughs.
Figure 3:
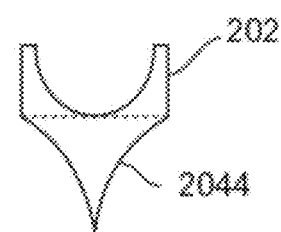
Figure 3:
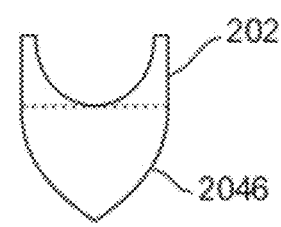

The refractory object can be machined to produce a different shape, a smoother surface, or both. The refractory block 102 can be machined to form a glass overflow forming block 200, as illustrated in FIG. 2. The glass overflow forming block 200, which is also a refractory object, has a body that includes a glass overflow trough portion 202 and a tapered portion 204. The glass overflow trough portion 202 includes a trough that has a depth that decreases along a length of the glass overflow forming block 200. FIG. 3 includes a cross-sectional view of exemplary shapes of the tapered portion 204. More particularly, the tapered portion can include a wedge shape 2042, a concave shape 2044, or a convex shape 2046. Other shapes may be used to meet the needs or desires for a particular application.

The refractory object may have one or more properties that are particularly noteworthy. Such properties can include creep resistance, porosity, grain size and aspect ratios of the grains. Porosity, grain size, and aspect ratios of the grains have been previously described.

The flexural creep rate is a measurement of the rate of deflection of a refractory object in a direction orthogonal to the length of the refractory object when the refractory object has been subjected to a predetermined mechanical stress at a predetermined temperature for a predetermined time period. In a particular embodiment, the creep rate is measured using a 4-point bending setup where the distance between the outer supports is 80 mm while the inner supports are 40 mm apart. An 8×9×100 mm surface ground bar of the material to test is placed on the bottom supports and a stress of 2 MPa was applied through the top fixture. The test is conducted at a temperature of 1275° C. for 50 hours. The deflection of the bar as a function of time is recorded during the whole test, and the deformation of the bar is then calculated. In a particular embodiment, the Hollenberg model can be used to calculate the deformation of the bar from the deflection of the bar, as described in "Calculation of Stresses and Strains in Four Point Bending Creep Tests," by G. W. Hollenberg et al., J. Am. Ceram. Soc., Vol. 54, N° 6, p 196-199 (1971). The creep rate is determined from the derivative of the deformation during the soak and is expressed in $\mu m/(\mu m \times hr)$. In an embodiment, the creep rate is no greater than approximately $1.0 \times 10^{-5}$ $\mu m/(\mu m \times hr)$, no greater than approximately $5.0 \times 10^{-6}$ $\mu m/(\mu m \times hr)$, no greater than approximately $3.0 \times 10^{-6}$ $\mu m/(\mu m \times hr)$, or no greater than approximately $2.0 \times 10^{-6}$ $\mu m/(\mu m \times hr)$.

Figure 4:
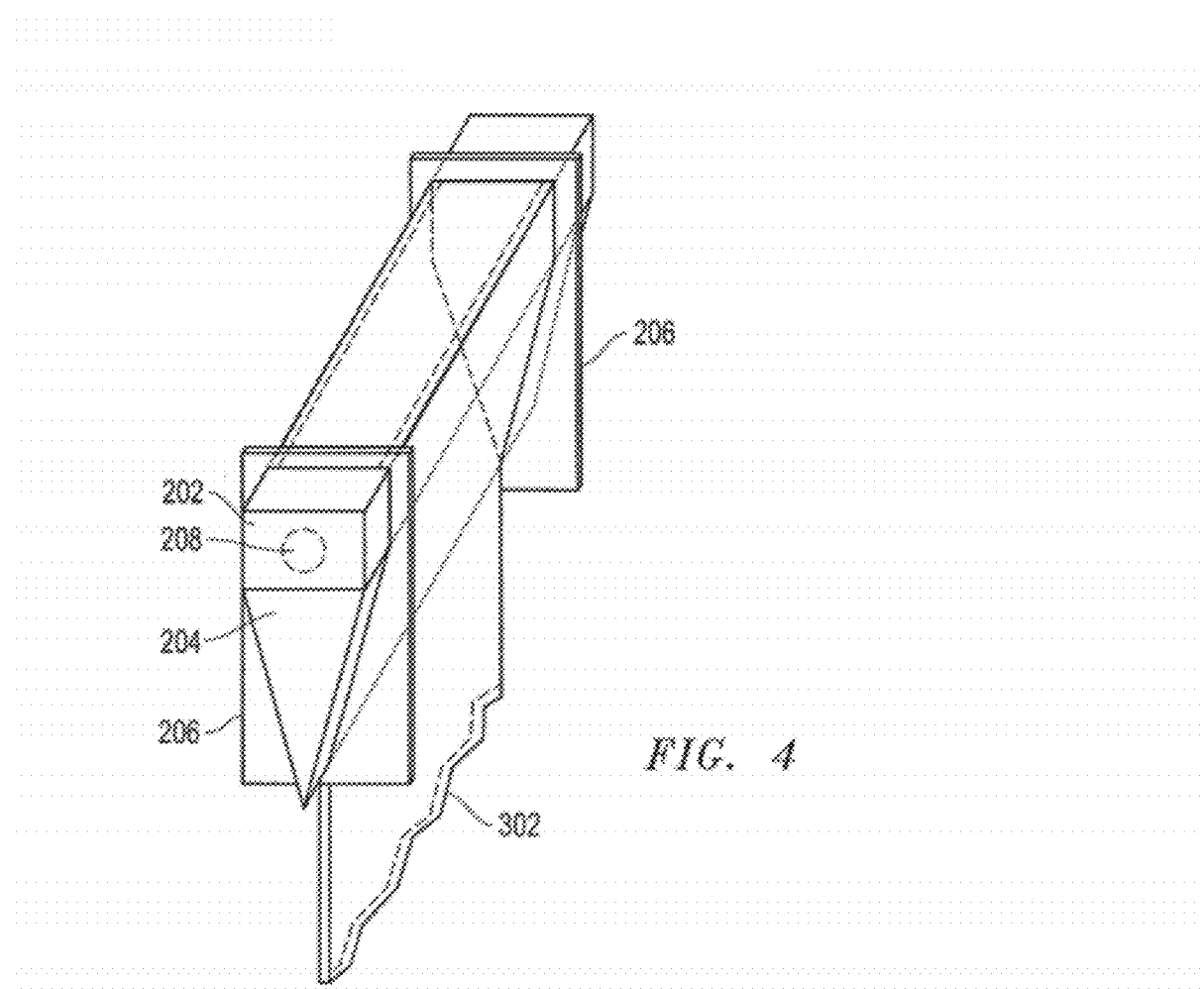
FIG. 4 is a diagram illustrating the formation of a particular glass sheet from the glass overflow trough.
Figure 5:
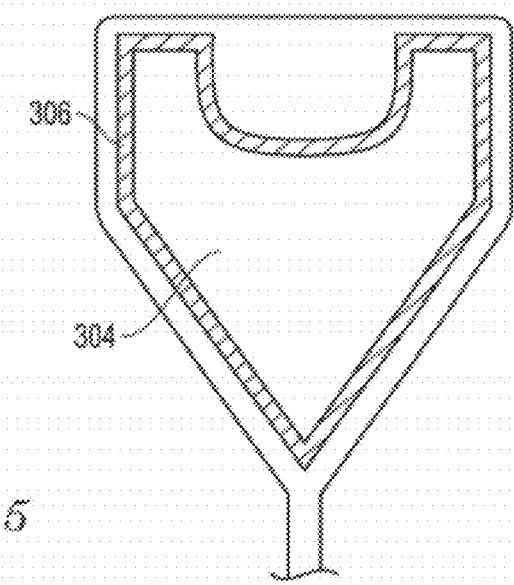
FIG. 5 is a diagram illustrating the cross-sectional setup of a glass overflow trough during glass production.

The refractory object, when in the form of a glass overflow forming block, can be useful in forming a glass sheet by a fusion process. FIGS. 4 and 5 include a perspective view and a cross-sectional view, respectively, of the glass overflow forming block during the formation of a glass sheet 302. The glass overflow forming block is heated to a temperature in a range of approximately 1050° C. to approximately 1300° C. The glass overflow forming block includes the glass overflow trough portion 202 and tapered portion 204, as previously described. In the embodiment as illustrated, the glass overflow forming block also includes end guards 206 that generally define the width of the glass sheet 302 as formed. The glass overflow forming block further includes an inlet port 208 that receives a molten glass composition. A trough within the glass overflow trough portion 202 receives the molten glass composition until the trough fills up. Thereafter, the molten glass composition flows over opposing lips of the glass overflow trough portion 202. The molten glass composition then flows along opposite outer surfaces of the glass overflow trough portion 202 and the tapered portion 204. At the end of the tapered portion 204 that is opposite the glass overflow trough portion 202, the molten glass composition along the opposite outer surfaces fuse together to form the glass sheet 302. In another embodiment, another type of glass object may be formed.

In an embodiment, the glass sheet 302 can have a thickness of at least approximately 20 µm, at least approximately 30 µm, or at least approximately 50 µm. In another embodiment, the glass sheet 302 may have a thickness no greater than approximately 5 mm, no greater than approximately 3 mm, or no greater than approximately 1.1 mm. With respect to the width, the process allows the end guards 206 to be set to permit any desired width of the glass sheet 302. For example, the glass sheet 302 can be at least approximately 0.5 m, at least approximately 1.1 m, at least approximately 2.0 m, at least approximately 4.0 m, or larger.

In a particular embodiment, the molten glass composition includes an Al—Mg—Si glass. In a more particular embodiment, the molten glass composition is substantially the same as described with respect to the alkali Al—Mg—Si glass. Referring to FIG. 5, during the glass formation process, Mg from the molten glass composition can form a layer 306 along surfaces of the body 304 of the glass overflow forming block. The layer can include a Mg—Al oxide. In a more particular embodiment, the layer can include $Mg_xAl_yO_z$, wherein z=x+1.5 y. In another more particular embodiment, the layer 306 includes a Mg—Al spinel.

Before the glass overflow forming block is used to form the glass, the body 304 can include $Al_2O_3$ and not include a separate phase or layer of a Mg—Al oxide. As the molten glass composition flows and forms the glass sheet 302, portions of the body 304 contact the molten glass composition and defines a glass contacting area. The layer 306 forms along the glass contacting area of the body 304 when the molten glass composition flows along the glass contacting area. The layer 306, including the Mg—Al oxide, can act as a diffusion barrier to reduce the amount of material from migrating from the body 304 (for example, $Al_2O_3$) into the molten glass composition. After initially forming the layer 306, the glass sheet 302 can have a more consistent composition over the life of the glass overflow forming block, and porosity of the glass overflow forming block may be reduced, as compared to the layer 306 not being formed.

Further, the layer 306 can be initially formed and remain at substantially the same temperature over the useful life of the glass overflow forming block. The likelihood of the layer 306 fracturing or spalling is substantially reduced because the temperature is not significantly changed. Accordingly, the difference between coefficients of thermal expansion of the materials within the body 304 and the layer 306 is not a significant design concern for embodiments as described herein.

Compare such embodiments to an alumina-containing body that is coated with a Mg—Al spinel layer along all exposed surfaces of the glass overflow forming block before the glass overflow forming block is installed in an oven, furnace, or other similar apparatus, which is hereinafter referred to as a "pre-coated glass overflow forming block." The body and layer of the pre-coated glass overflow forming block have different compositions. After installing the pre-coated glass overflow forming block, the temperature of the pre-coated glass overflow forming block increases from approximately room temperature (for example 20° C. to 25° C.) to the temperature as previously described for glass formation. The likelihood of the layer along the outside of the pre-coated glass overflow forming block is significantly more likely to fracture or spall due to the large temperature range over which the pre-coated glass overflow forming block is exposed. Thus, portions of the layer may break off into the molten glass composition, or another adverse consequence may occur.

Many different aspects and embodiments are possible. Some of those aspects and embodiments are described herein. After reading this specification, skilled artisans will appreciate that those aspects and embodiments are only illustrative and do not limit the scope of the present invention.

In a first aspect, a refractory object can be used in forming a glass object. The refractory object can include at least 10 wt % $Al_2O_3$, and a first dopant includes an oxide of a rare earth element, Ta, Nb, Hf, or any combination thereof.

In an embodiment of the first aspect, the refractory object has a property that includes an amount of the first dopant sufficient to keep an averaged grain size from increasing more than 500% during a sintering operation, grains with an averaged aspect ratio of no greater than approximately 4.0, a D10 value of the aspect ratio for alumina-containing grains is no greater than approximately 1.2, a D50 value of the aspect ratio for the alumina-containing grains is no greater than approximately 1.6, the grains with a D90 value of the aspect ratio for the alumina-containing grains is no greater than approximately 2.7, a percentage of the grains having an aspect ratio of at least 2.0 is no greater than approximately 30%, a percentage area occupied by the grains having an aspect ratio of at least 2.0 is no greater than approximately 35%, the averaged grain size of no greater than approximately 90 μm, a D10 value of a grain size for the grains is no greater than approximately 40 μm, a D50 value of the grain size for the grains is no greater than approximately 60 μm, a D90 value of the grain size for the grains is no greater than approximately 90 μm, a creep rate no greater than approximately $1.0 \times 10^{-5}$ μm/(μm× hr) as measured at a pressure of 2 MPa and a temperature of 1275° C., or any combination thereof.

In a second aspect, a refractory object can be used in forming a glass object. The refractory object can include at least 10% by weight $Al_2O_3$. The refractory object has a property that includes an amount of a first dopant sufficient to keep an averaged grain size from increasing more than 500% during a sintering operation, grains with an averaged aspect ratio of no greater than approximately 4.0, a D10 value of the aspect ratio for alumina-containing grains is no greater than approximately 1.2, a D50 value of the aspect ratio for the alumina-containing grains is no greater than approximately 1.6, a D90 value of the aspect ratio for the alumina-containing grains is no greater than approximately 2.7, a percentage of grains having an aspect ratio of at least 2.0 is no greater than approximately 30%, a percentage area occupied by grains having an aspect ratio of at least 2.0 is no greater than approximately 35%, the averaged grain size of no greater than approximately 90 μm, a D10 value of a grain size for grains is no greater than approximately 40 μm, a D50 value of the grain size for the grains is no greater than approximately 60 μm, a D90 value of the grain size for the grains is no greater than approximately 90 μm, a creep rate no greater than approximately $1.0 \times 10^{-5}$ μm/(μm×hr) as measured at a pressure of 2 MPa and a temperature of 1275° C., or any combination thereof.

In a third aspect, a process of forming a glass object can include providing a refractory object including a glass overflow trough. The refractory object can include at least 10% by weight of $Al_2O_3$, and an amount of a first dopant includes an oxide of a rare earth element, Ta, Nb, Hf, or any combination thereof. The process can further include flowing a glass material including Al—Si—Mg oxide into the glass overflow trough and over a lip of the glass overflow trough to define a glass contacting area. The process can further include when flowing the glass material, forming a layer of $Mg_xAl_yO_z$ along the glass contacting area.

In an embodiment of the third aspect, the glass object is in a form of a glass sheet. In a particular embodiment, the glass sheet has a thickness of at least approximately 20 μm, at least approximately 30 μm, or at least approximately 50 μm. In another particular embodiment, the glass sheet has a thickness no greater than approximately 5 mm, no greater than approximately 3 mm, or no greater than approximately 1.1 mm. In still another particular embodiment, the glass sheet has a width of at least approximately 0.2 m, at least approximately 0.5 m, at least approximately 0.7 m, at least approximately 1.1 m, at least approximately 2.0 m, at least approximately, or at least approximately 2.8 m. In a further embodiment, the glass object includes an alkali glass.

In a fourth aspect, a process of forming a refractory object can include preparing a body that includes at least 10% by weight of $Al_2O_3$, and an amount of a first dopant includes an oxide a rare earth element, Ta, Nb, Hf, or any combination thereof. The process can also include sintering the body to form the refractory object.

In an embodiment of the fourth aspect, the process further includes shaping the refractory object into a glass overflow forming block. In another embodiment, the body includes a shape of a glass overflow forming block.

In a particular embodiment of any of the embodiments or aspects described herein, the first dopant is $Ta_2O_5$, $Nb_2O_5$, $ZrO_2$, $HfO_2$, MgO, $Y_2O_3$, $Sc_2O_3$, $Yb_2O_3$, $Pr_2O_3$, $Sm_2O_3$, $Gd_2O_3$, $La_2O_3$, $CeO_2$, $Dy_2O_3$, or any combination thereof. In another embodiment, the $Al_2O_3$ is present in an amount by weight of at least 80%, 90%, or 95%. In still another embodiment, the refractory object or the process further includes a second dopant that includes a sintering agent. In a particular embodiment, the first dopant includes Zr, Hf, Mg, Y, Sc, Yb, P, Sm, Gd, La, Ce, Dy, or any combination thereof.

In a particular embodiment of any of the embodiments or aspects described herein, the amount of the first dopant is sufficient to keep an averaged grain size from increasing more than approximately 500%, more than approximately 400%, more than approximately 300%, more than approximately 200%, or more than approximately 100% during a sintering operation. In another particular embodiment, the creep rate is no greater than approximately $1.0 \times 10^{-5}$ µm/(µm×hr), no greater than approximately $5.0 \times 10^{-6}$ µm/(µm×hr), no greater than approximately $3.0 \times 10^{-6}$ µm/(µm×hr), or no greater than approximately $2.0 \times 10^{-6}$ µm/(µm×hr).

In a further particular embodiment of any of the embodiments or aspects described herein, the averaged aspect ratio is no greater than approximately 3.0, no greater than approximately 2.5, no greater than approximately 2.2, or no greater than approximately 2.0. In still a further particular embodiment, the D10 value of the aspect ratio is no greater than approximately 1.2, no greater than approximately 1.16, no greater than approximately 1.14, or no greater than approximately 1.12; the D50 value of the aspect ratio is no greater than approximately 1.6, no greater than approximately 1.55, no greater than approximately 1.50, or no greater than approximately 1.45; the D90 value of the aspect ratio is no greater than approximately 2.7, no greater than approximately 2.3, no greater than approximately 2.0, or no greater than approximately 1.8; or any combination thereof. In yet a further particular embodiment, the percentage of grains having an aspect ratio of at least 2.0 is no greater than approximately 30%, no greater than approximately 20%, no greater than approximately 9%, or no greater than approximately 5%; the percentage area occupied by grains having an aspect ratio of at least 2.0 is no greater than approximately 35%, no greater than approximately 30%, no greater than approximately 25%, no greater than approximately 15%, or no greater than approximately 5%, or no greater than approximately 3%; or any combination thereof.

In another particular embodiment of any of the embodiments or aspects described herein, the amount by weight of the first dopant is no greater than approximately 5 wt %, no greater than approximately 4 wt %, no greater than approximately 3 wt %, no greater than approximately 2 wt %, or no greater than approximately 1.5 wt %. In still another particular embodiment, the amount by weight of the first dopant is at least approximately 0.02 wt %, at least approximately 0.11 wt %, at least approximately 0.2 wt %, or at least approximately 0.5 wt %. In yet another particular embodiment, the refractory object or the process further includes a second dopant that is a sintering agent and is different from the first dopant. In a further particular embodiment, the first dopant is $Ta_2O_5$, $Nb_2O_5$, or any combination thereof. In still a further particular embodiment, the refractory object is substantially free of calcium, silicon, titanium, iron, sodium, or any combination thereof. In yet a further particular embodiment, the refractory object includes $TiO_2$, CaO, $SiO_2$, $Fe_2O_3$, $Na_2O$, or any combination thereof at a concentration of no greater than approximately 0.5 wt %, no greater than approximately 0.09 wt %, no greater than approximately 0.05 wt %, or no greater than approximately 0.009 wt %.

In a particular embodiment of any of the embodiments or aspects described herein, the refractory object has a density of at least approximately 3.3 g/cc, at least approximately 3.5 g/cc, at least approximately 3.6 g/cc, or at least approximately 3.65 g/cc. In another particular embodiment, the refractory object has a density no greater than approximately 3.9 g/cc, no greater than approximately 3.8 g/cc, or no greater than approximately 3.7 g/cc. In still another particular embodiment, the refractory object has a porosity of at least approximately 0.1%, at least approximately 1.1%, at least approximately 2.0%, or at least approximately 3.0%. In a further embodiment, the refractory object has a porosity no greater than approximately 9.0 vol %, no greater than approximately 7.0 vol %, or no greater than approximately 5.0 vol %.

In a particular embodiment of any of the embodiments or aspects described herein, the D10 value of the grain size is no greater than approximately 40 µm, no greater than approximately 30 µm, no greater than approximately 20 µm, no greater than approximately 15 µm, or no greater than approximately 11 µm; the D50 value of the grain size is no greater than approximately 60 µm, no greater than approximately 50 no greater than approximately 40 µm, no greater than approximately 30 µm, or no greater than approximately 20 µm; the D90 value of the grain size is no greater than approximately 90 µm, no greater than approximately 70 µm, no greater than approximately 50 µm, no greater than approximately 40 µm, or no greater than approximately 35 µm; or any combination thereof. In another particular embodiment, the refractory object has an averaged grain size no greater than approximately 90 µm, no greater than approximately 30 µm, no greater than approximately 20 µm, or no greater than approximately 15 µm. In still another particular embodiment, the refractory object includes grains in a size distribution having a plurality of modes, wherein a first mode includes a first set of grains having a first averaged grain size of at least approximately 0.5 µm, at least approximately 1.0 µm, or at least approximately 5.0 µm. In a more particular embodiment, the size distribution has a second mode including a second set of grains having a second averaged grain size no greater than approximately 20 µm, no greater than approximately 15 µm, or no greater than approximately 12 µm. In yet another particular embodiment, the refractory object includes at least approximately 95% by weight $Al_2O_3$, the first dopant includes $Ta_2O_5$, $Nb_2O_5$, $HfO_2$, or any combination thereof at approximately 0.2≤x≤approximately 5% by weight, approximately 0.5≤x≤approximately 4% by weight, approximately 0.8≤x≤approximately 2.5% by weight, approximately 1≤x≤approximately 2% by weight, and a grain size having an averaged aspect ratio no greater than approximately 2.0.

In a further particular embodiment of any of the embodiments or aspects described herein, the refractory object has no outer layer. In still a further particular embodiment, the refractory object includes a glass overflow trough portion. In yet a further particular embodiment, the refractory object includes a glass overflow forming block. In a more particular embodiment, the glass overflow forming block has a cross section in a shape that is tapered from the bottom of the glass overflow forming block. In another more particular embodiment, the glass overflow forming block has a cross section in a shape of a wedge. In still another more particular embodiment, after using the glass overflow forming block to form the glass object, the refractory object further includes a layer including a Mg—Al oxide over a body of the glass overflow forming block. In an even more particular embodiment, the layer consists essentially of $Mg_xAl_yO_z$, wherein $z=x+1.5\ y$. The layer may consist essentially of a Mg—Al spinel. In a further particular embodiment of any of the embodiments or aspects described herein, the refractory object has a length of at least approximately 0.5 m, approximately 1.1 m, at least approximately 2.0 m, or at least approximately 4.0 m.

EXAMPLES

The concepts described herein will be further described in the following examples, which do not limit the scope of the invention described in the claims. Numerical values in this Examples section may be approximated or rounded off for convenience.

Refractory objects including a variety of different sintered ceramic materials are prepared using the following process and following raw materials. Alumina powders have a D50 value of between 1 and 15 microns and a purity higher than 99.8%, wherein the total combined content of $TiO_2$, $Fe_2O_3$, CaO, and $SiO_2$ in the alumina powders is below 0.05 wt %. In forming some samples, alumina powders having different grain sizes are combined. For example, a first alumina powder having a D10 value between a range of approximately 2 microns and approximately 4 microns, a D50 value between a range of approximately 6 microns and approximately 9 microns, and a D90 value between a range of approximately 42 microns and 44 microns; a second alumina powder having a D10 value between a range of approximately 0.75 microns and approximately 2 microns, a D50 value between a range of approximately 1 and approximately 3 microns, and a D90 value between a range of approximately 3.5 and approximately 5 microns; and a third alumina powder having a D10 value between a range of approximately 0.75 microns and approximately 2 microns, a D50 value between a range of approximately 2.5 and 4.5 microns, and a D90 value between approximately 9 microns and approximately 11 microns are combined to form particular samples.

The alumina powders are used in combination with dopants, such as $TiO_2$ (99% pure, D50 value of 2.5 micron), $Ta_2O_5$ (99.9% pure, D50 value of 1 micron), $Nb_2O_5$ (99.9% pure, D50 value of approximately 1 micron). Addition of silica (amorphous silica of at least 98% purity, and a D50 value of less than 1 micron) or mullite (fused mullite of less than 0.5% impurity, and a D50 value of no greater than 45 micron) are present in some of the samples. Other dopants can be added if needed or desired. Table 1 includes the compositions of some of the samples, all of which are principally alumina containing. Trace levels of impurities may be present but are not reported, as such impurities typically do not significantly affect the performance of such samples.

During a first step the alumina powders and dopants are mixed with deflocculants and water so as to form a slurry of powders. The mixture of the raw materials is then spray dried so as to form a batch that is then formed into a green body (100×100×150 mm) by isostatic pressing. The slurry could also be used as is to form the green body using slip-casting, vibrocasting or other casting techniques. The raw materials could also be dry-mixed and then formed into a block using another forming technique, such as unidirectional pressing, ramming or other dry forming techniques. In a last step the green body is fired at a temperature of at least 1400° C. and up to 1700° C. so as to produce a dense refractory block.

TABLE 1

| Name | Composition |
| --- | --- |
| Sample 1 | 1 wt % $Ta_2O_5$, remainder is $Al_2O_3$ |
| Sample 2 | 1 wt % $Nb_2O_5$, remainder is $Al_2O_3$ |
| Comparative Sample 1 | A1148 ™-brand block* |
| Comparative Sample 2 | 0.75 wt % $TiO_2$, remainder is $Al_2O_3$ |
| Comparative Sample 3 | 0.75 wt % $TiO_2$, 1.5 wt % $SiO_2$, remainder is $Al_2O_3$ |
| Comparative Sample 4 | 0.75 wt % $TiO_2$, 5 wt % mullite, remainder is $Al_2O_3$ |

*Composition is 95.2 wt % $Al_2O_3$, 2.8 wt % $SiO_2$, 0.4 to 0.8 wt % $TiO_2$, and 1.2 to 1.6 wt % other materials ($Fe_2O_3$, $Na_2O$, $ZrO_2$, CaO, MgO).

The samples are cut, and cross-sectional images were obtained by a scanning electron microscope ("SEM"). The samples are tested to determine density and porosity. The density and porosity are determined using the methodologies as previously described.

TABLE 2

| Name | Density (g/cc) | Porosity (%) | Creep Rate ($\mu m/(\mu m \times hr)$) |
| --- | --- | --- | --- |
| Sample 1 | 3.69 | 4.4 | $1.70 \times 10^{-6}$ |
| Comparative Sample 1 | 3.43 | 0.2 | $8.86 \times 10^{-6}$ |
| Comparative Sample 2 | 3.66 | 5.7 | $7.56 \times 10^{-6}$ |
| Comparative Sample 3 | 3.75 | 0.1 | $7.48 \times 10^{-6}$ |
| Comparative Sample 4 | 3.71 | 0.1 | $6.09 \times 10^{-6}$ |

Figure 6:
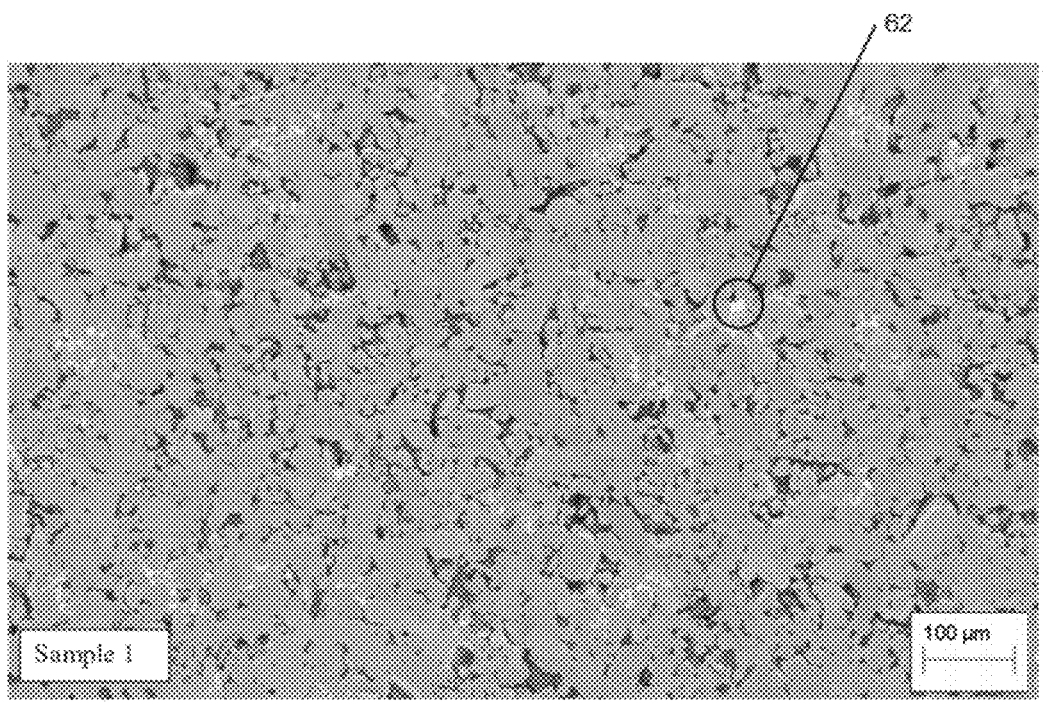
FIG. 6 is a SEM image of a cross-sectional portion of Sample 1.
Figure 7:
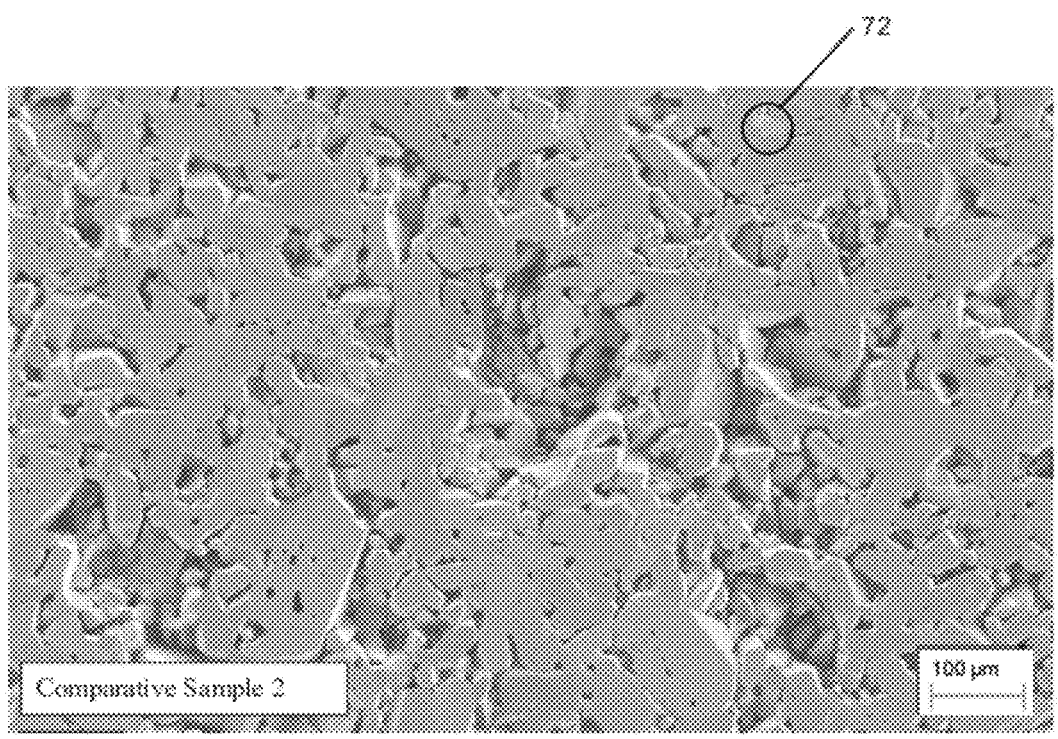
FIG. 7 is a SEM image of a cross-sectional portion of Comparative Sample 2.

FIGS. 6 and 7 include scanning electron microscope ("SEM") images of Sample 1 and Comparative Sample 2. During sample preparation, some grains can be pulled out from the surface due to a lack of sufficient mechanical support of such grains and the high level of shear stress during the polishing step. Even if the missing grains are taken into account, Sample 1 clearly has a lower porosity. The SEM images show that Sample 1 and Comparative Sample 2 include separate phases. Most of Sample 1 and Comparative Sample 2 include an alumina phase. Referring to FIG. 6, another phase in Sample 1 includes Ta and is light gray (almost white) in color. Area 62 in FIG. 6 illustrates a portion that includes the Ta-containing phase. The Ta-containing phase includes Fe, Ti, Ca, Na, all of which are not separately added but are present as impurities in the starting materials. Hence, the tantalum can be an impurity getter. Referring to FIG. 7, another phase in Comparative Sample 2 includes Ti and is a slightly lighter gray (almost white) in color as compared to the alumina phase. Area 72 in FIG. 7 illustrates a portion that includes the Ti-containing phase.

Particular data about grain size and distribution is presented for two different parts of Sample 1 and Comparative Sample 2 as Dataset 1 and Dataset 2 in Table 3. The data was obtained using the technique as previously described with respect to grain size determination.

TABLE 3

|  | Sample 1, Dataset 1 | Sample 1, Dataset 2 | Comparative Sample 2, Dataset 1 | Comparative Sample 2, Dataset 2 |
|---|---|---|---|---|
| Average Length (μm) | 18.3 | 18.5 | 69.3 | 77.6 |
| Average Width (μm) | 13.3 | 13.4 | 38.8 | 36.7 |
| Average aspect ratio (avg. l/avg. w) | 1.4 | 1.4 | 1.9 | 2.2 |
| D10 (length) | 10.0 | 10.8 | 42.1 | 46.8 |
| D50 (length) | 15.0 | 16.7 | 63.8 | 68.1 |
| D90 (length) | 30.3 | 28.2 | 94.0 | 107.2 |
| D10 (aspect ratio) | 1.1 | 1.1 | 1.2 | 1.4 |
| D50 (aspect ratio) | 1.4 | 1.4 | 1.6 | 2.1 |
| D90 (aspect ratio) | 1.7 | 1.7 | 2.8 | 3.2 |
| % number of grains with aspect ratio of 2.0 or higher | 2.2% | 4.7% | 33.3% | 61.0% |
| % area of grains with aspect ratio of 2.0 or higher | 0.37% | 2.4% | 39.7% | 67.1% |

The lengths and widths of the grains are smaller with Sample 1 as compared to Comparative Sample 2. In general, the lengths of the grains for Sample 1 are about ¼ that of the corresponding length parameter for Comparative Sample 2, and the widths of the grains for Sample 1 are about ⅓ that of the corresponding width parameter for Comparative Sample 2. Further, the distribution of lengths of the grains and aspect ratios for Sample 1 are significantly narrower than with Comparative Sample 2. The percentage of grains having an aspect ratio of 2.0 or greater is no more than 4.7% for Sample 1, and the percentage of grains having an aspect ratio of 2.0 or greater is at least 33.3% for Comparative Sample 2, Similarly, the percentage of area occupied by grains having an aspect ratio of 2.0 or greater is no more than 2.4% for Sample 1, and the percentage of grains having an aspect ratio of 2.0 or greater is at least 39.7% for Comparative Sample 2, Still further, the data in datasets 1 and 2 of Sample 1 are closer to one another than datasets 1 and 2 for Comparative Sample 2. Thus, the properties of Sample 1 are more uniform throughout the sample, and the properties of Comparative Sample 2 are more diverse.

Additional samples are formed using the processes described previously. Samples 3, 4, 5, and 6, as well as comparative sample 5, are formed from a mixture of alumina powders having a D10 value within a range of approximately 2.0 and approximately 2.6 microns, a D50 value within a range of approximately 4.8 microns and approximately 6.1 microns, and a D90 value within a range of approximately 25.5 and approximately 27.5 microns. The mixture of alumina powders includes alumina within a range of approximately 99.5 wt % and approximately 99.9 wt % with the remainder impurities, such as $Fe_2O_3$, $TiO_2$, $Na_2O$, $SiO_2$. Sample 3 is formed by providing approximately 0.5 wt % of approximately 99.9% pure $Ta_2O_5$, sample 4 is formed by providing approximately 0.9 wt % of approximately 99.9% pure $Ta_2O_5$, sample 5 is formed by providing approximately 1.1 wt % $Ta_2O_5$, and sample 6 is formed by providing approximately 1 wt % of approximately 99.9% pure $Ta_2O_5$ and. In addition, comparative sample 5 is formed from approximately 0.2 wt % of approximately 99% pure $TiO_2$. Further, comparative sample 6 is formed from approximately 99 wt % alumina powder having a D10 value of between approximately 0.1 microns and approximately 0.4 microns, a D50 value of between approximately 1.3 microns and approximately 2.1 microns, and a D90 value within a range of approximately 5.1 microns and approximately 6.4 microns, and approximately 1 wt % MgO powder. Comparative sample 7 is formed from approximately 100% alumina powder having a D50 value within a range of approximately 0.3 microns to approximately 1.1 microns and a D90 value within a range of approximately 2.1 microns and approximately 3.2 microns.

Table 4 includes the compositions of samples 3, 4, 5, and 6 and comparative samples 5, 6, and 7. Trace levels of impurities may be present, but are not reported, as such impurities typically do not significantly affect the performance of such samples.

TABLE 4

| Name | Composition |
|---|---|
| Sample 3 | 0.5 wt % $Ta_2O_5$, remainder is $Al_2O_3$ |
| Sample 4 | 0.9 wt % $Ta_2O_5$, remainder is $Al_2O_3$ |
| Sample 5 | 1.1 wt % $Ta_2O_5$, remainder is $Al_2O_3$ |
| Sample 6 | 1 wt % $Ta_2O_5$, remainder is $Al_2O_3$ |
| Comparative Sample 5 | 0.2 wt % $TiO_2$, remainder is $Al_2O_3$ |
| Comparative Sample 6 | 1 wt % MgO, remainder is $Al_2O_3$ |
| Comparative Sample 7 | Approximately 100 wt % $Al_2O_3$ |

In addition, Table 5 includes density, porosity, and creep rate for samples 3, 4, 5, and 6 and comparative samples 5, 6, and 7. The density, porosity, and creep rate are determined using the methodologies described previously.

TABLE 5

| Name | Density (g/cc) | Porosity (%) | Creep Rate ($\mu m/(\mu m \times hr)$) |
|---|---|---|---|
| Sample 3 | 3.62 | 4.9 | |
| Sample 4 | 3.59 | 4.4 | |
| Sample 5 | 3.64 | 4.9 | |
| Sample 6 | 3.59 | 6.1 | |
| Comparative Sample 5 | 3.63 | 5.4 | $4.91 \times 10^{-4}$ |
| Comparative Sample 6 | 3.74 | 0.5 | $2.40 \times 10^{-6}$ |
| Comparative Sample 7 | 3.76 | 3.5 | $3.44 \times 10^{-6}$ |

Further, Table 6 includes grain size and distribution for samples 3, 4, 5, and 6 and comparative samples 5, 6, and 7. The grain size and distribution are determined using the methodologies described previously using a computer program to measure lines representing the dimensions of the grains.

TABLE 6

|  | Sample 3 | Sample 4 | Sample 5 | Sample 6 | Comp. Sample 5 | Comp. Sample 6 | Comp. Sample 7 |
|---|---|---|---|---|---|---|---|
| Average Length (μm) | 9.9 | 7.7 | 10.2 | 10.9 | 38.0 | 8.7 | 8.7 |
| Average Width (μm) | 6.3 | 5.0 | 6.3 | 7.0 | 22.1 | 4.7 | 5.2 |
| Average aspect ratio (avg. l/avg. w) | 1.7 | 1.6 | 1.7 | 1.6 | 1.8 | 1.9 | 1.8 |
| D10 (length) | 6.0 | 4.6 | 5.3 | 5.7 | 18.1 | 4.7 | 3.6 |
| D50 (length) | 8.8 | 7.4 | 8.8 | 9.4 | 37.9 | 7.9 | 6.3 |
| D90 (length) | 15.1 | 11.2 | 17.9 | 15.9 | 59.9 | 13.8 | 18.4 |
| D10 (aspect ratio) | 1.1 | 1.1 | 1.2 | 1.1 | 1.2 | 1.2 | 1.2 |
| D50 (aspect ratio) | 1.6 | 1.5 | 1.5 | 1.5 | 1.7 | 1.9 | 1.6 |

TABLE 6-continued

| | Sample 3 | Sample 4 | Sample 5 | Sample 6 | Comp. Sample 5 | Comp. Sample 6 | Comp. Sample 7 |
|---|---|---|---|---|---|---|---|
| D90 (aspect ratio) | 2.4 | 2.3 | 2.5 | 2.2 | 2.5 | 2.6 | 2.4 |
| % number of grains with aspect ratio of 2.0 or higher | 21% | 20% | 20% | 23% | 21% | 36% | 24% |
| % area of grains with aspect ratio of 2.0 or higher | 14% | 21% | 25% | 27% | 32% | 46% | 36% |

In comparing the grain sizes and distributions of samples 3, 4, 5, and 6 with that of comparative samples 5, 6, and 7, the average aspect ratio of samples 3, 4, 5, and 6 are lower than that of comparative samples 5, 6, and 7. Additionally, the % area of grains with an aspect ratio of 2.0 or higher is lower for samples 3, 4, 5, and 6 as opposed to comparative samples 5, 6, and 7. Thus, grains of samples 3, 4, 5, and 6 are more equiaxial than the grains of comparative samples 5, 6, and 7. Further, grain growth is more limited in samples 3, 4, 5, and 6. In particular, the D50 value for the starting materials of samples 3, 4, 5, and 6 is in a range of approximately 4.8 to 6.1 microns with the samples having D50 values for length less than 10 microns. Thus, grain growth for samples 3, 4, 5, and 6 is less than 110%. For comparative samples 6 and 7, the starting materials had D50 values within a range of 1.3 to 2.1 microns and 0.3 to 1.1 microns, respectively. The D50 values for the samples are 7.9 for comparative sample 6 and 6.3 for comparative sample 7 representing at least 300% to 800% growth in grains of comparative samples 6 and 7.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A refractory object used in forming a glass object, wherein the refractory object comprises:
   at least 97 wt % $Al_2O_3$;
   at least 0.5 wt % and not greater than 3 wt % of a first dopant including $Ta_2O_5$;
   a second dopant including Zr, Hf, Y, Sc, Yb, Pr, Sm, Gd, La, Ce, Dy, or any combination thereof; and
   not greater than 0.5 wt. % $TiO_2$.

2. The refractory object according to claim 1, wherein the amount of the first dopant is sufficient to keep an averaged grain size from increasing more than approximately 300% during a sintering operation.

3. The refractory object according to claim 1, wherein the refractory object includes grains in a size distribution having a plurality of modes, wherein a first mode includes a first set of grains having a first averaged grain size of at least approximately 0.5 μm.

4. The refractory object according to claim 3, wherein the size distribution has a second mode including a second set of grains having a second averaged grain size no greater than approximately 20 μm.

5. The refractory object according to claim 1, wherein a creep rate of the refractory object is no greater than approximately $1.0 \times 10^{-5}$ μm/(μm×hr) as measured at a pressure of 2 MPa and a temperature of 1275° C.

6. A refractory object used in forming a glass object, the refractory object comprises:
   at least 93% by weight $Al_2O_3$;
   at least 0.5% by weight and not greater than 5% by weight of $Ta_2O_5$;
   a second dopant including Zr, Hf, Y, Sc, Yb, Pr, Sm, Gd, La, Ce, Dy, or any combination thereof; and
   not greater than 0.5 wt. % $TiO_2$;
   wherein the refractory object has a property including:
      a percentage of grains of the refractory object having an aspect ratio of at least 2.0 is no greater than approximately 30%; and
      a percentage area occupied by the grains having an aspect ratio of at least 2.0 is no greater than approximately 30%.

7. The refractory object according to claim 6, wherein:
   a D10 value of the aspect ratio is no greater than approximately 1.2;
   a D50 value of the aspect ratio is no greater than approximately 1.6;
   a D90 value of the aspect ratio is no greater than approximately 2.7; or
   any combination thereof.

8. The refractory object according to claim 6, wherein:
   a D10 value of a size of the grains is no greater than approximately 40 μm;
   a D50 value of a size of the grains is no greater than approximately 60 μm;
   a D90 value of a size of the grains is no greater than approximately 90 μm;
   or any combination thereof.

9. The refractory object according to claim 6, wherein the refractory object has a porosity of at least approximately 0.1 vol % and no greater than approximately 5.0 vol %.

* * * * *